United States Patent [19]

Lubbers

[11] Patent Number: 5,226,806
[45] Date of Patent: Jul. 13, 1993

[54] VERTICAL AXIS WIND TURBINE

[76] Inventor: John Lubbers, 60695 Gratiot Ave., New Haven, Mich. 48048

[21] Appl. No.: 845,046

[22] Filed: Mar. 3, 1992

[51] Int. Cl.⁵ ............................................. B64C 11/28
[52] U.S. Cl. .......................... 416/132 B; 416/197 A; 416/9
[58] Field of Search ............. 416/9, 17, 117, 132 B, 416/240, 197 A

[56] References Cited

U.S. PATENT DOCUMENTS

| | | | |
|---|---|---|---|
| 662,737 | 11/1900 | Puszkar | 416/132 B |
| 811,218 | 1/1906 | Harrington | 416/132 B |
| 842,054 | 1/1907 | Barker | 416/132 B |
| 1,201,184 | 10/1916 | Holben | 416/17 |
| 4,365,935 | 12/1982 | Zukeran | 416/117 |

Primary Examiner—Edward K. Look
Assistant Examiner—Mark Sgantzos
Attorney, Agent, or Firm—John R. Benefiel

[57] ABSTRACT

A wind turbine is described which includes a vertical axle mounted for rotation to drive an output utilization device. Around the axle is arranged a circumferential array of wind vanes, each wind vane comprising a generally rectangular panel of flexible material supported in a frame and having a pocket opened along a vertical side which is able to flare out and catch the wind in one direction but collapse upon rotation around to the opposite direction, allowing a net output power to be generated by the wind being received in the wind vane pockets. A successive opening of the pockets insures a rapid opening action. A releasable hinging of the wind vane frame allows spilling of winds at excessive wind speeds.

6 Claims, 3 Drawing Sheets

VERTICAL AXIS WIND TURBINE

BACKGROUND OF THE INVENTION

This invention concerns wind turbines and more particularly a wind turbine having a series of sails or vanes radially arranged about a central axle for rotation about a vertical axis. Such devices have been heretofore described in the prior art. The essential arrangement comprises a series of vanes which are configured to catch the wind while moving with the wind so as to drive the central axle, but are faired to present a much reduced or eliminated reaction surface when rotating toward the wind direction. This imparts a net momentum acting on the central axle tending to rotate the axle in a single direction. The wind energy is thus converted to mechanical energy, which may be used to drive a utilization device such as a pump or an electrical generator.

Such vertical axis wind turbines have for the most part involved complex mechanisms to cyclically reconfigure or reorient the vanes to a wind catching and a wind reacting shape or orientation as the vane rotates about the central axis. Such mechanisms add cost and complexity to the device, and further require maintenance and the mechanism also reduces the available output power of the device, since these mechanisms require work to be operated due to frictional losses, etc.

The object of the present invention is to provide such a vertical axis wind turbine which is extremely simple and does not require significant maintenance but which yields a high power output from an input of wind energy.

Other such devices have been developed which a simpler opening and closing action of the vane is contrived to catch the wind in one direction and to fold together in the other direction. It is necessary for such simpler devices also to operate efficiently such as to maximize the wind energy conversion in order to enhance the net output of the device.

Accordingly, it is another object of the present invention to provide a simple, vertical axis wind turbine in which an effective opening action to the wind reactive configuration of the vane is provided so as to provide a high efficiency device which operates reliably in various wind conditions.

A further problem with all wind energy conversion devices is the capability of operating in a wide range of wind conditions from fairly light breezes to gale force winds without destroying or damaging the device, particularly at higher wind speeds.

It is still another object of the present invention to provide such a wind energy conversion device which can be operated across an extreme range of wind speeds without danger of destruction or damage to the components of the device.

SUMMARY OF THE INVENTION

The invention comprises an arrangement of flexible material vanes supported on vertically oriented vane frames, the vane frames in turn supported on radial arms projecting from a central axle. Each of the vanes is comprised of a series of flaps or open sided pockets formed by main panels and overlying panels attached thereto which are opened successively by the wind as the frame is swung about the central axis such as to expose the open side of the pocket to the wind force.

As each vane rotates back and toward the wind direction, the pockets collapse to provide the low resistance to the wind force and thus establish a net reaction angular momentum on the assembly of vanes and frames tending to rotate the central axle in a single direction.

The vane frames comprise parallel spaced arms connected at their tops and bottoms with cross members. The cross members support the top and bottom of the fabric vanes respectively. The entire vane frame may be hinged at the top to allow a swinging of the bottom of the vane frame both in and out to spill the wind. The vane frame in this design option may be secured with a releasable catch such as a magnetic type latch so that the hinging action occurs only in excessive wind force. The swinging in or out of the vane frame results in a spilling of the wind to prevent overspeed and damage or destruction of the device.

The opening pocket sail has been found to operate efficiently and yet does not involve moving parts or mechanisms requiring complex componentry and high wind forces to operate.

DESCRIPTION OF THE DRAWING FIGURES

DETAILED DESCRIPTION

In the following detailed description certain specific terminology will be employed for the sake of clarity and a particular embodiment described in accordance with the requirement of 35 USC 112 but it should be understood that the specific description is not intended to be limiting and indeed should not be so construed inasmuch as the invention is capable of taking many forms and variations within the scope of the appended claims.

Figure 1:
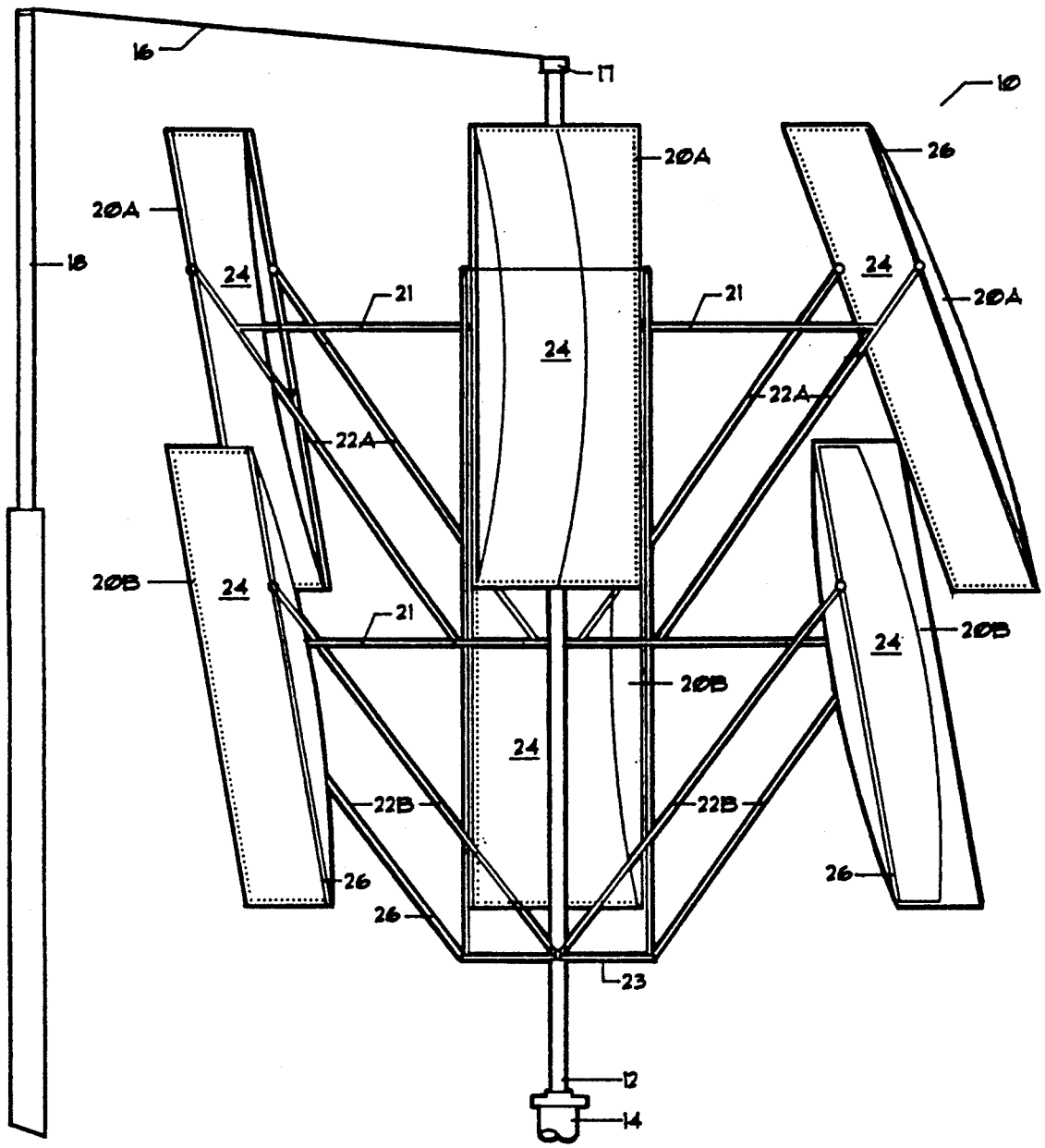
FIG. 1 is a side elevational view of the vertical axis wind turbine according to the present invention.
Figure 2:
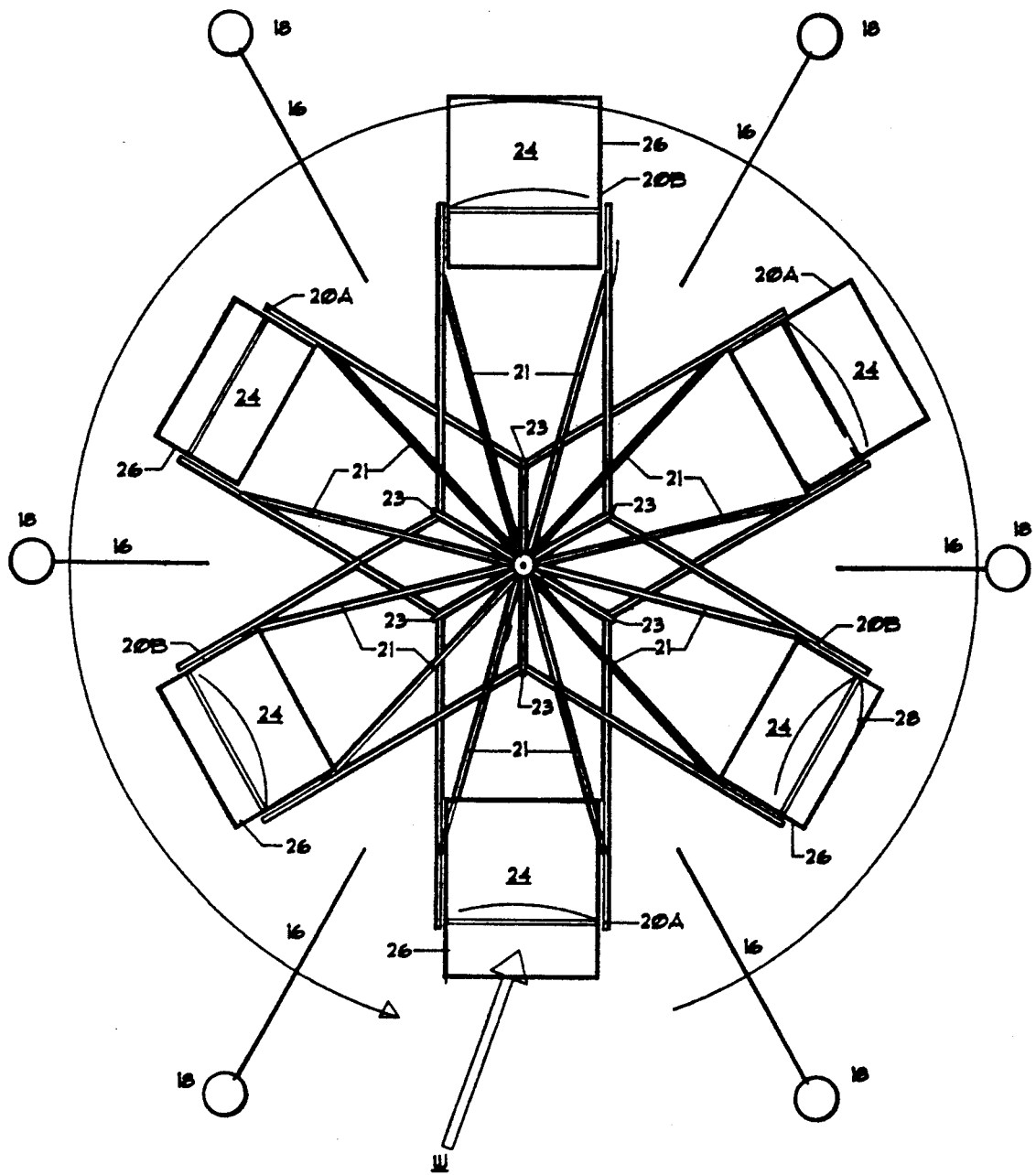
FIG. 2 is plan view of the wind turbine illustrating the pocket opening action of the flexible material wind vanes as rotation of the individual vanes about the central axis proceeds

Referring to the drawings and particularly FIGS. 1 and 2, the wind turbine 10 according to the present invention is shown in a simplified representation to clearly illustrate the functioning of the invention. The wind turbine 10 includes an axle 12 mounted for rotation about a vertical axis. A rotary support means 14 may be included which may also incorporate a utilization device such as an electrical generator or pump.

The axle 12 is typically supported to its upper end by a series of guy wires 16 attached at one end to a rotary cap 17 (the guy wires 16 shown in fragmentary form in FIG. 2). The guy wires 16 are attached at the other end to a series of vertical support poles 18 arranged about the axle 12.

A two tiered series of wind vanes 20 are arranged circumferentially spaced about the axle 12 and located radially outwardly therefrom.

In the illustration of FIG. 1, two sets of three wind vanes are provided 20A and 20B each located at different vertical levels of the axle 12. The wind vanes 20A, 20B in each set are located angularly equispaced from each other, with each set offset from the other as shown in FIG. 2.

Support means here comprise sets of parallel support arms 22A and 22B radiating outwardly from the axle 12.

Horizontal radially converging struts 21 are attached to the upper parts of arms 22A and axle 12, while cross members 23 are attached at the lower ends of arms 22A, 22B and axle 12.

Each wind vane 20A, 20B includes a main substantially flat panel section of a flexible material 24 supported on three sides in a generally rectangular wind vane frame 26 pivotally mounted to the support arms 22A, 22B. The flexible material may be of a suitable durable sail cloth, such as Dacron (trademark) so as to be able to withstand strong blowing forces and exposure to the weather.

Each wind vane 20A, 20B also includes a substantially flat panel overlayer 28, also of flexible material which is fastened along one vertical side 30 to the main section 24 and also at the horizontal top and bottom side to the frame work 26. The overlayer 28 creates an open mouthed pocket which is able to flare outwardly when receiving a wind flow from a direction opposite the attached side 30, as illustrated in FIG. 2.

This vane construction establishes the one way wind reacting characteristic of the wind vane, necessary to establish a vertical axis wind turbine, since as when the wind vanes, 20A, 20B rotate about the vertical axis of rotation of the axle 12 there is a flaring out of the narrow width overlayer 28 as best seen in FIG. 2, combined with a flaring out of the main section 24 to establish a large area wind reactive feature. The wind thus causes rotation of the axle 12 to drive the rotary unit 14.

As each wind vane 20A,20B rotates to begin to be headed with the attached side 30 towards the direction from which the wind is originating, the pocket quickly collapses, as best seen in FIG. 2, such as to establish a minimal reactive surface to the force of the wind. Accordingly a net wind energy conversion to angular momentum is established, allowing a rotary drive of the axle 12 by the force of the wind.

Figure 3:
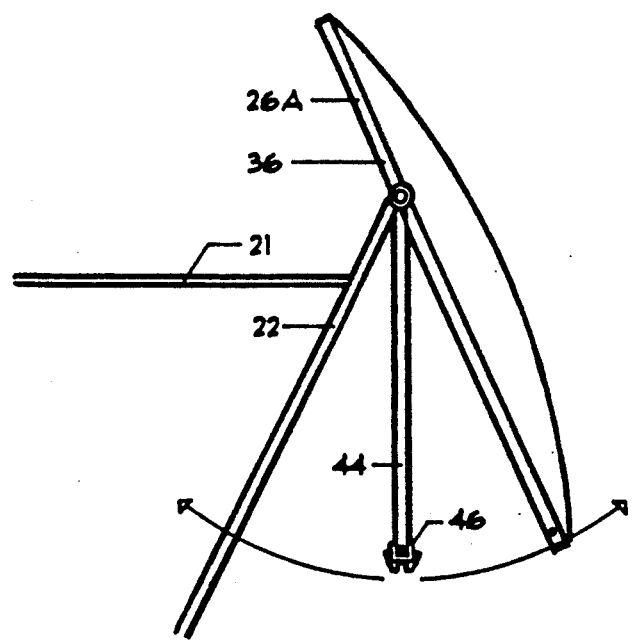
FIG. 3 is a side elevational view of the individual vane frame, showing the swing out action.
Figure 4:
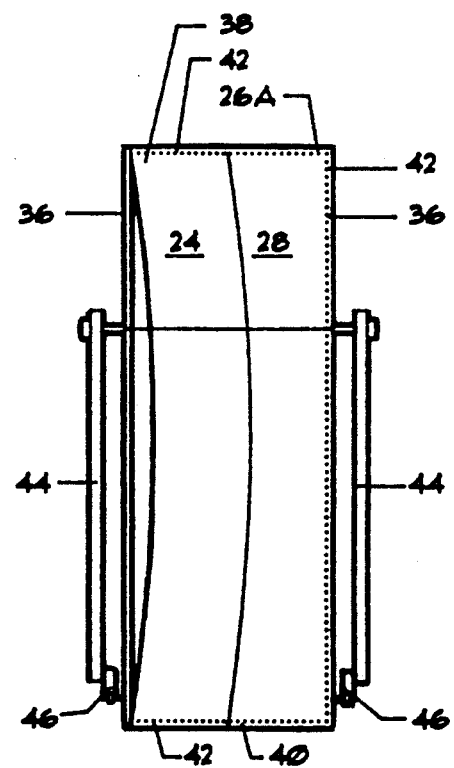
FIG. 4 is a front view of a single fabric wind vane and supporting frame and arms equipped with a latch enabling an overload swinging action.

Alternatively, a latch means may hold each frame 26 vertical until an excessive wind force is exerted on the frame. This is shown in FIGS. 3 and 4. Each frame 26 may swing in when facing the wind, or swing out when facing away, to spill air in high winds. This will result in a relatively stable rate of rotation even at relatively high wind speeds.

The frame 26A includes a pair of spaced apart vertical members 36 and a top cross member 38 and a bottom cross member 40. The main sail section has hems 42 sewn in the fabric section and overlayer 28 secured thereto on their sides.

The frame 26 is pivotally supported on the support arms 22 preferably at an intermediate point as indicated in FIGS. 3 and 4. Suitable vertical members 42 are fixed extending down from the upper ends of a respective support arm 22A and mount a releasable holding catch 46 such as a magnetic latch. This releasably holds the lower side of the frame 26, and thus upon encountering excessive wind forces the frame 26 and wind vane 20 are free to hinge and swing in or out to spill a great proportion of the wind. Thus the structure of the win is protected if excessive wind speeds occur by a very simple, fail safe arrangement.

I claim:

1. A vertical axis wind turbine comprising:
   a vertically extending axle supported for rotation about a vertical axis;
   a series of wind vanes arranged around said axle;
   support means supporting each of said wind vanes on said axle, each of said wind vanes comprising a substantially flat main panel section of flexible material draped vertically by said support means to extend in a circumferential direction;
   each of said wind vanes including at least on pocket comprised of a substantially flat overlayer panel of flexible material overlying the outside of said wind vane flexible material panel section and attached thereto along a vertical side by a seam and also attached thereto along the top and bottom, but unattached along the other side to form a normally closed pocket which is able to flare open when wind is blowing from the unattached side thereof and thereby catch said wind, said pocket collapsing when wind blows from the attached side of said overlayer by said overlayer panel again overlying said main panel section.

2. The vertical wind turbine according to claim 1 wherein said support means includes a generally rectangular wind vane frame including a pair of spaced vertical parallel members and top and bottom cross members extending between the top and bottoms of said parallel members, said section of flexible material secured to said frame.

3. The vertical wind turbine according to claim 2 wherein said support means includes a plurality of arms extending radially outward from said axle, each arm extending to a respective frame.

4. The vertical wind turbine according to claim 3 further including means pivotally supporting each wind frame to allow hinging along a horizontal axis to allow swinging radially in or out.

5. The vertical wind turbine according to claim 4 further including releasable holding means releasably holding the bottom until a predetermined force level is exerted, said bottom thereafter able to swing away freely.

6. The vertical wind turbine according to claim 1 wherein two sets of wind vanes are arranged circumferentially spaced around said axle, each set at a different vertical level along the height of said axle.

* * * * *